May 2, 1950
H. L. MILLS
2,505,983
ILLUMINATING MEANS FOR CAMERA
RANGE DETERMINING DEVICES
Filed July 10, 1946
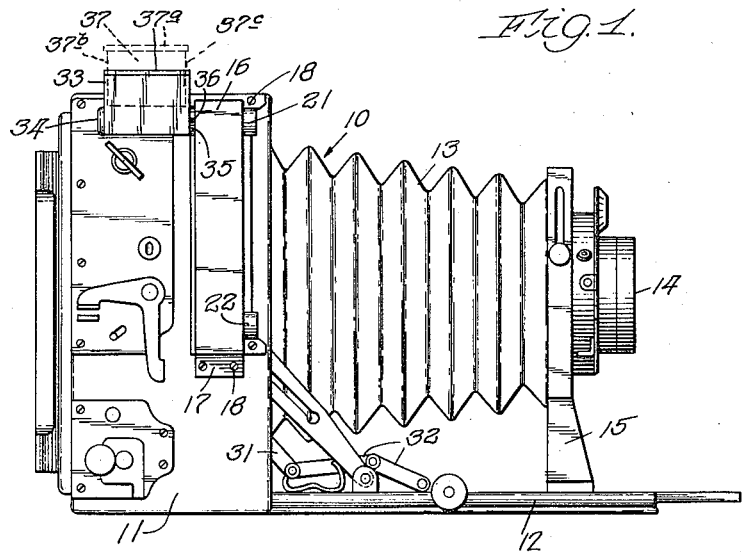
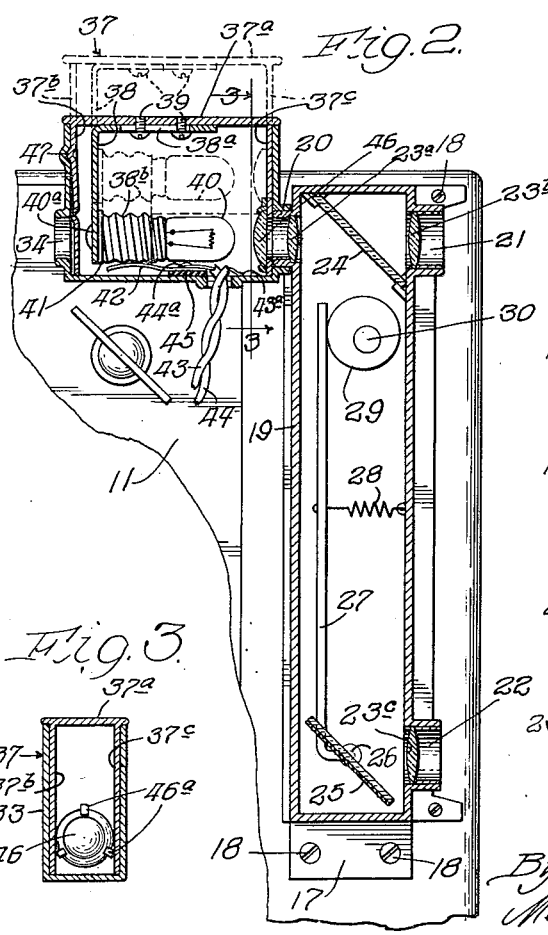
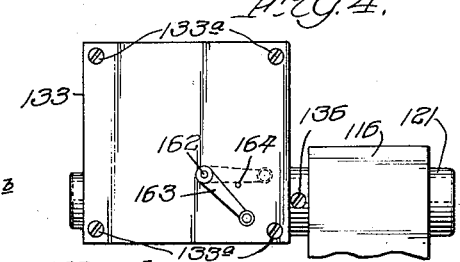
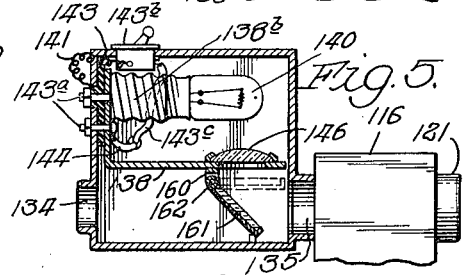
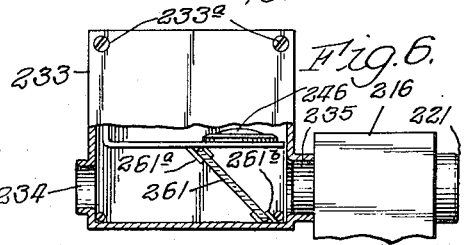
Inventor:
HIRAM LAWRENCE MILLS

Patented May 2, 1950 2,505,983

UNITED STATES PATENT OFFICE 2,505,983

ILLUMINATING MEANS FOR CAMERA RANGE DETERMINING DEVICES

Hiram Lawrence Mills, Dallas, Tex.

Application July 10, 1946, Serial No. 682,457

2 Claims. (Cl. 88—2.4)

This invention relates to a range determining device, and more particularly to range determining apparatus for use with a conventional range finder.

One feature of this invention is that it provides improved range finding apparatus; another feature of this invention is that it provides a device adapted to be secured to the eyepiece of a conventional range finder to enable the range finder to be used in the dark; a further feature of this invention is that it provides apparatus enabling the user to look through the eyepiece of the range finder without removing the device from said eyepiece; still another feature of this invention is that it provides means for providing light rays and for selectively moving such light rays into and out of alignment with the eyepiece of the range finder; yet a further feature of this invention is that it can be embodied in apparatus including movable mirror means adapted to be moved into and out of operative relation with the eyepiece of a range finder; and yet another feature of this invention is that it can also be embodied in apparatus including fixed transparent mirror means. Additional features and advantages of this invention will be apparent from the following specification, and from the drawings in which:

Figure 1 is a side elevation of a camera and range finder, including one embodiment of my invention; Fig. 2 is an enlarged vertical sectional view of the range finder shown in Fig. 1, and including said embodiment of my invention; Fig. 3 is a vertical sectional view on the line 3—3 of Fig. 2; Fig. 4 is an elevation of another embodiment of my invention secured to a range finder; Fig. 5 is a vertical section through the apparatus shown in Fig. 4; and Fig. 6 is an elevation, partly in section, of another modification of my invention.

Many modern cameras include a range finder attachment by means of which the camera may be properly focused upon the object to be photographed, and even when a camera is not equipped with a so called "built in" coupled range finder, it is common practice in the art to utilize a separate range finder to ascertain the distance from the camera to the object to be photographed. Conventional range finders may employ two mirrors in vertical alignment, the upper mirror being fixed and being of the transparent type, and the lower mirror being rotatable. The user, upon looking into the eyepiece of the range finder, sees two images of the object to be photographed—one reflected from the lower mirror and the rear face of the upper mirror, and one visible directly through the transparent upper mirror. By adjustment of the angle of the lower mirror these two images may be brought together, and when this is done the distance to the object to be photographed is registered by the range finder or, in the case of a coupled range finder, the camera is then automatically in proper focus. Obviously, a certain minimum of light is required in order to see the images of the object to be photographed.

In my prior Patent No. 2,312,261, which issued on February 23, 1943, I disclosed means whereby rays of light may be provided and projected through the eyepiece of such a conventional range finder, in order that such a range finder may be used conveniently under relatively dark conditions. My present invention constitutes an improvement upon such apparatus, mainly in providing means whereby light rays utilizing my earlier invention may be developed and projected through the eyepiece of a range finder in order that such range finder may be used in the dark, while at the same time providing means whereby such range finder may be used under ordinary daylight conditions without removing my improved range determining device from the eyepiece.

Other attempts have also been made by others to provide means for developing light rays and projecting such rays into the range finder, so that it may be used in the dark. The word "dark," as used throughout this application, means merely that there is insufficient illumination for fully satisfactory use of a conventional range finder, which involves considerable loss in illumination. Such prior art devices are subject to serious disadvantages, in that if they are capable of attachment to the eyepiece of the range finder, they must be removed or pivoted out of the way before the range finder can be used under ordinary daylight conditions, for otherwise the eyepiece of the range finder is blocked. Other such prior art devices avoid this limitation by mounting the device on top of the range finder. Such devices are clearly disadvantageous, for it is necessary to drill additional holes in the range finder and provide additional mounting means thereon.

I have devised and am here disclosing and claiming a range determining device for use with a conventional range finder whereby all these prior art disadvantages are avoided. My new device is adapted to be secured to the eyepiece of a conventional range finder, thereby allowing the easy attachment of the device to a range finder, and doing away with the necessity of drilling additional holes in the range finder. My device may be purchased separately from the range finder, and may be utilized with any conventional range finder without the trouble, delay and expense of drilling the range finder, or otherwise adapting it for use with my device. At the same time, my present invention may be permanently attached to the eyepiece of a conventional range finder, and the range finder may then be used both in daylight and in darkness without removing the device from the eyepiece.

Referring now to the drawings, my invention is illustrated in Figure 1 as being used with a conventional camera and range finder. Since the operation of such a camera and range finder is old, it will be only briefly described here, and such description will be understood to be only for the purpose of illustration for it will be obvious that my present invention may be used in conjunction with various other types of cameras and range finders, or may be utilized with a range finder separate from a camera. In Figure 1, a conventional camera 10 is shown as comprising a casing 11, a bed 12, a collapsible bellows 13, and a lens 14. As is commonly known in the art, in order to take pictures with a sharp definition it is necessary that the camera be properly focused, which includes positioning the lens of the camera the proper distance in front of the film. The positioning of a particular lens relative to the film in order to obtain sharp focus varies and is a function, within predetermined limits, of the distance of the object to be photographed from the camera. In the particular camera illustrated, the lens may be moved toward or away from the film by means of the lens board or support 15, which is capable of movement back and forth along the camera bed 12.

A conventional range finder 16 is mounted on the side of the camera by means of the bracket 17 and the screws 18, and includes a body member 19 which is completely closed to the passage of light except for the opening provided for the eyepiece 20, the upper window opening 21 and the lower window opening 22. In each of said openings is mounted a lens, as the lenses here identified as 23a, 23b and 23c. The range finder functions by means of the fixed transparent mirror 24, and the rotatable mirror 25 which is pivotally mounted on the shaft 26, such shaft being fixedly connected to the operating arm 27 which is held by the spring 28 against the cam 29 eccentrically mounted on the cam shaft 30.

Since the operation of such a coupled range finder is no part of the present invention and is thoroughly understood in the art, it will not be described in detail here, except to say that when the support 15 is moved in or out along the camera bed 12, the cam shaft 30 with the cam 29 is caused to be rotated by the lever 31 and the links 32. Rotation of the cam shaft 30 and the eccentrically mounted cam 29 will move the mirror 25 pivotally about its shaft 26. Therefore, when the user looks into the eyepiece 20 he sees one image of the object to be photographed straight through the transparent mirror 24 and the window 21, and he also sees a second image of the object to be photographed, such second image entering the range finder through the window 22 and being reflected into the eyepiece 20 by means of the mirrors 24 and 25. By moving the support 15 backward or forward along the camera bed 12, the angle of the mirror 25 may be varied until the two images are superimposed and appear as one, and when this occurs the camera 10 is properly focused.

Of course, it will be understood that other range finders may merely provide a dial giving the distance to the object to be photographed, and that still other conventional range finders may split the image of the object to be photographed, rather than providing two images to be superimposed one on the other.

My present invention comprises a device adapted to be secured to the eyepiece of any conventional range finder to enable such range finder to be used in darkness, while at the same time enabling the user to look through the range finder eyepiece without removing said device therefrom. As shown in the drawings, a casing 33 is provided with two oppositely disposed viewing openings 34 and 35, the opening 34 being designed to be looked into by the user, while the opening 35 is adapted to receive the projecting flange of the eyepiece 20 of the range finder, and the casing may be secured thereto by means of the set screw 36. It is contemplated that bushings may be provided for the opening 35 to adapt the casing to fit the eyepiece of any conventional range finder.

Slidably mounted within the casing 33 is the movable member 37, here illustrated as comprising the top portion 37a, and side portions 37b and 37c. As shown in Figure 2, an L-shaped bracket 38 is adjustably mounted within the inner chamber, such bracket being slotted at 38a to permit adjustment by means of the screws 39. The figure 40 indicates a light source which is here illustrated as a conventional lamp mounted in the socket 38b and carried by bracket 38, although it will be understood that various other sources of light may be utilized if desired. The socket 38b is carried by the L-shaped bracket 38 near the lower (in the drawing) end thereof, and is insulated from such bracket by means of a washer 41, except that means are provided for bringing the central terminal 40a of the lamp into contact with said bracket.

The other terminal of the lamp is adapted to touch the spring contact 42 when the lamp is in the position shown in solid lines in Figure 2. The leads 43 and 44, here shown only fragmentarily, are adapted to terminate in a conventional plug (not shown) which plug may be inserted in a socket connected across the terminals of the battery of a conventional photo flash synchronizer unit commonly utilized with such a camera. The other end of the lead 43 is soldered, or otherwise electrically connected at 43a to the casing 33, and the lead 44 is soldered, or otherwise electrically connected at 44a to the spring contact 42, which spring contact is insulated from the casing by the insulating washer 45. In this embodiment of my invention it is contemplated that the casing 33, the movable member 37, and the bracket 38 be made of electrically conducting material and be in electrical contact with each other so that an electrical circuit will be completed through the lamp 40 whenever the leads are plugged into the battery socket and whenever the lamp 40 is down in the position shown in solid lines in Figure 2, and the lamp will glow when it is in alignment with the eyepiece of the range finder, as shown in solid lines in Figure 2.

A condensing lens 46 is mounted in an opening in the side 37c of the movable member, and is held in the path of the light rays emanating from the lamp by the brackets 46a, the distance between the lamp and the lens being variable to provide the proper focusing, by means of the screws 39, as heretofore described.

It will be seen in Figure 2, that the member 37 is movable vertically within the casing 33, and may be frictionally held in either of two desired positions by means of the detent 47. When the movable member is up in the position shown in dotted lines in Figure 2, the view through the openings 34 and 35 into the eyepiece 20 is unobstructed, and the range finder may be put to ordinary daylight use, but when the movable member 37 is down in the position shown in solid lines in Figure 2, the lamp and the condensing lens will be aligned with said eyepiece. As heretofore explained, when the movable member which carries the lamp is in the position shown in dotted lines in Figure 2, the automatic switch means will allow a current to pass through the lamp and the lamp will glow, emitting light which is passed through the condensing lens and formed into substantially parallel rays which enter the range finder through the eyepiece 20.

As is more fully explained in my prior Patent No. 2,312,261, a portion of these light rays extend straight through the transparent mirror 24 and the window 21, and by proper aiming of the camera will be projected upon the object to be photographed. Another portion of such rays will be deflected downward from the surface of the transparent mirror 24 onto the reflecting surface of the rotatable mirror 25, and will from there be projected through the window 22. By proper rotation of the mirror 25 in the manner heretofore explained, the two light spots thus projected upon the object to be photographed may be superimposed one on the other. When this is done, the camera will be in focus, and a picture may be taken by any of the well known methods of night photography.

If it is desired to use the range finder in ordinary daylight, it is merely necessary to pull the movable member 37 up to the position shown in dotted lines in Figure 2. Such member will be frictionally held in such dotted line position by means of the detent 47, and the lamp 40 and the condensing lens 46 will be moved out of alignment with the eyepiece 20, so that an unobstructed view into the range finder is now provided through the viewing openings 34 and 35.

Another embodiment of my invention is shown in Figures 4 and 5, reference numerals being used in such figures 100 higher than are used for similar parts in Figures 1, 2 and 3. Thus in Figure 4, a casing 133 having a cover mounted by means of the screws 133a, and having oppositely disposed viewing openings 134 and 135, is shown secured by means of the set screw 136 to the eyepiece of a range finder 116. Positioned in the socket 138b within the upper portion of such casing and out of alignment with said eyepiece is the lamp 140, connection being made between the center terminal of said lamp and the lead 143 by means of the stud 143a, such stud being insulated from the casing by the insulating washer 141, and connection being made from the lead 143 to one terminal of a toggle switch 143b. Connection is made between one of the power supply leads or cords 143c and the toggle switch, and between the other terminal of said lamp and cord lead 144 by means of the socket 138a and the stud 144a. The L-shaped bracket 138 is mounted on the casing by means of such studs 143a and 144a, and near its right hand end below the lamp said bracket holds the condenser lens 146. The spacing between the lamp and the lens may be varied by bending the bracket. On the under side of said bracket a mounting bracket 160 provides a pivotal mounting for the mirror 161, such mirror being pivoted on the shaft 162 and being rotatable between two terminal positions by means of the handle 163 which projects outside of the casing. The detent 164 provides releasable locking means for holding the mirror in the terminal position shown in dotted lines in Figure 5.

When the mirror is in such upper position, there is an unobstructed view through the viewing openings 134 and 135 into the eyepiece of the range finder. When it is desired to use my invention for range finding in the dark, it is merely necessary to swing the mirror down to its solid line position by means of the handle 163, and to turn on the lamp by plugging in the cord or by any conventional switch means in the cord or unit (not shown here). When this has been done, the lamp will provide rays of light which are arranged substantially parallel by the condensing lens 146 and reflected by the mirror 161 into the eyepiece of the range finder 116, and night focusing may be accomplished in the same manner as described in connection with the first embodiment of my invention.

Figure 6 illustrates another modified form of my invention, in which similar parts are designated by reference numerals 200 higher than those used in Figures 1 and 2. In this embodiment of my invention, a casing 233, having a cover secured thereon by means of screws 233a, is mounted on the eyepiece of a range finder 216 in the manner heretofore described, and since the members contained in the upper half of said casing are similar in structure and operation to the members shown in the upper half of the casing in Figure 5, they will not be further described.

In this modification of my invention, the light rays projected from the condensing lens 246 impinge upon the fixed transparent mirror 261 which is angularly mounted in alignment with said viewing openings by the brackets 261a and 261b, and the direction of such light rays is changed and they are reflected into the eyepiece of the range finder. Inasmuch as the mirror 261 is of the commonly known transparent or silver-flecked type, it is allowed to remain in alignment with the viewing openings and the eyepiece, and when the range finder is operated in daylight, the user simply looks into the opening 234, through the mirror 261, and into the range finder 216.

While I have shown and described certain embodiments of my invention, it is to be understood that it is capable of many modifications. Changes, therefore, in the construction and arrangement may be made without departing from the spirit and scope of the invention, as disclosed in the appended claims.

I claim:

1. Range determining apparatus of the character described for use with a conventional range finder, including: a casing adapted to be secured to the eyepiece of said range finder, said casing having at least one viewing opening in alignment with said eyepiece and spaced therefrom; a movable member slidably mounted in said casing; releasable means for frictionally holding said movable member in at least one position in said casing; and a lamp carried by said movable member and adapted to be moved into and out of alignment with said eyepiece upon movement of said movable member.

2. Range determining apparatus of the character described for use with a conventional range finder, including: a casing adapted to be secured to the eyepiece of said range finder, said casing having at least one viewing opening in alignment with said eyepiece and spaced therefrom; a movable member slidably mounted in said casing; releasable means for frictionally holding said movable member in at least one position in said casing; a lamp carried by said movable member; a condensing lens spaced from said lamp and movable with said movable member, said lamp and condensing lens being adapted to be moved into and out of alignment with said eyepiece upon movement of said movable member; means for varying the spacing between said lamp and condensing lens; and switch means so connected as to operate the lamp when said lamp is moved into alignment with said eyepiece.

HIRAM LAWRENCE MILLS.

REFERENCES CITED

The following references are of record in the file of this patent:

UNITED STATES PATENTS

| Number | Name | Date |
|---|---|---|
| 1,703,705 | Beij | Feb. 26, 1929 |
| 1,918,206 | Ermisch | July 11, 1933 |
| 2,282,045 | Fleischer | May 5, 1942 |
| 2,305,437 | Meyers et al. | Dec. 15, 1942 |
| 2,312,261 | Mills | Feb. 23, 1943 |
| 2,388,714 | Schwarz et al. | Nov. 13, 1945 |
| 2,397,160 | Schwarz et al. | Mar. 26, 1946 |

FOREIGN PATENTS

| Number | Country | Date |
|---|---|---|
| 562,441 | Germany | Oct. 26, 1932 |